United States Patent [19]
Hoshino

[11] Patent Number: 5,533,405
[45] Date of Patent: Jul. 9, 1996

[54] SOUND COMPARISON DEVICE FOR A DRUM

[75] Inventor: Yoshiki Hoshino, Aichi-Ken, Japan

[73] Assignee: Hoshino Gakki Co., Ltd., Japan

[21] Appl. No.: 150,461

[22] Filed: Nov. 10, 1993

[30] Foreign Application Priority Data

Apr. 6, 1993 [JP] Japan .................. 5-23150 U

[51] Int. Cl.⁶ ...................... G01L 5/04; G01D 13/02
[52] U.S. Cl. ............... 73/760; 73/862.451; 73/862.471; 73/159; 73/862; 73/452; 73/863.472; 84/104
[58] Field of Search ............ 84/104; 73/862.151, 73/862.471, 862.472, 159, 862.452

[56] References Cited

U.S. PATENT DOCUMENTS

| | | | |
|---|---|---|---|
| 1,802,685 | 4/1931 | Trier | 73/862.471 |
| 3,750,466 | 8/1973 | Ott et al. | 73/862.471 |
| 4,116,054 | 9/1978 | Howe | 73/862.452 |

FOREIGN PATENT DOCUMENTS 5511298 8/1980 Japan.

*Primary Examiner*—Richard E. Chilcot, Jr.
*Assistant Examiner*—Jewel V. Artis
*Attorney, Agent, or Firm*—Ostrolenk, Faber, Gerb & Soffen

[57] ABSTRACT

A sound comparison device for a drum that has a body that includes a bottom with a periphery. The periphery of the bottom of the body is in contact with the surface of a drum head. A drum head tension measurement element includes a tip which protrudes from the bottom of the body. A spring biases the tip to press against and sink into the drum head to a distance determined by the tension on the drum head. A display is connected with the measurement element for causing the display to display a numerical value Y which corresponds to distance X of the protrusion of the measurement element. The values X and Y are coordinated so that the display displays the value $Y=K/X^{1/2}$, where K is a constant.

6 Claims, 13 Drawing Sheets

READING OF THE DIAL GUAGE (mm) (Y)
(AMOUNT OF THE CHANGE IN THE SPINDLE)

SOUND COMPARISON DEVICE FOR A DRUM

BACKGROUND OF THE INVENTION

1. Field of the Invention

The present invention relates to a device for comparing the sounds made by a drum at the time of an adjustment of the sound of the drum which is to be employed in band performances, etc.

2. Description of the Related Art

Figure 18:
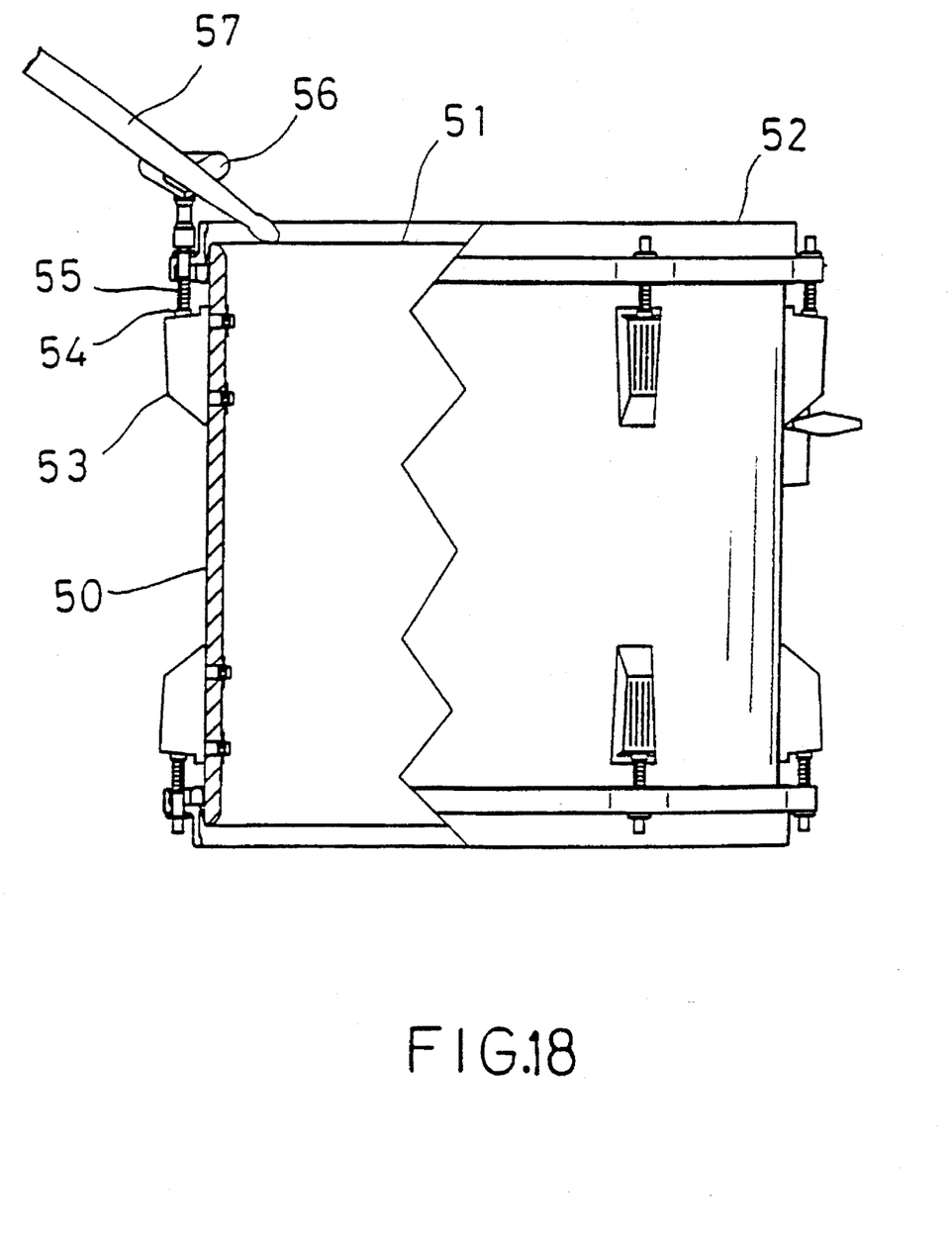
FIG. 18 is a partial cross section through the drum head.

Musical instrument drums include the bass drum, floor tom, tom-tom and a snare drum with a snappy mounted on it, etc. in the order of the size of their calibers. All drums have a beatable membrane which is called the drum head. The drum head is affixed to the drum, typically in the manner shown in FIG. 18. The drum head 51 is mounted on the upper and optionally the lower edges of the drum body. A respective drum head tightening hoop 52 is placed on the outer peripheral edge of the drum head 51. Next, a tightening bolt 55 is screwed to the lug nuts 54 which have been arranged at equally spaced intervals around the drum body through a respective lug 53 on the outer periphery on the side of the drum body 50. The hoop 52 is compressively tightened, thereby fixing the drum head 51 to the drum body 50. A tuning key 56 tightens the drum head by selectively tightening each lug and its nut. In addition, the drum head 51 is evenly stretched over the entire range prior to the performance.

To tune the drum head, in the past, the area of the drum head in the neighborhood of each tightening bolt 55 for the drum head was lightly beaten with a stick 57. The high or low sound which was generated was compared with the sound in the neighborhood of the tightening bolt so that the tightening bolt might be adjusted with the tuning key so as to eliminate the difference between the high sound and the low sound.

As the performer carried out this adjusting operation while directly listening to the sound generated by the drum stick with his ears, the adjusting operation would have to be carried out in a quiet location where the sound made by the stick would not be erased by or made unclear due to the noise of the surrounding area. In addition, extreme care and caution is required for such an operation. Thus, it requires both time and skill. Since it would be extremely difficult for a layman or a performer without very sensitive hearing to adjust the drum, performances may have been presented without correct adjustment, at the present stage of development.

Current drum heads are made of a polyester film or membrane, with a thickness approximately in the range between 50 and 400 microns. The highness or lowness of the pitch of the sound generated by beating the drum head is ultimately determined by tightening the drum head by means of the tightening bolt. If there are a strongly stretched part and a weakly stretched part of the drum head, the overall sound produced would be a combination of both these sounds, which would produce an impure sound or a growling sound, which is not desirable for a drum.

Any part too tightly stretched, moreover, will lead to a durability problem, as the polyester film that constitutes the drum head may exceed the range of its elastic deformation, or go beyond its yield point and ultimately rupture.

Therefore, a device for measuring the tensile force on the drum head previously has been proposed. (See Official Gazette of Patent Kokai (Laid Open) No. Sho 57-37231).

This prior art device comprises an annular base, a detecting bar which is installed freely movable in the vertical direction at the center of the base, and a dial gauge installed sideways at the top of the annular base. The annular base is placed on the surface of the drum head, the surface of the drum head is pressed upon by the detecting bar enough to cause the bar to sink in to the drum head, and the amount of the sinking in of the detecting bar is displayed on the dial gauge.

In the device just described, however, the value which is indicated by the dial gauge does not conform to the high or low sound of the drum, thereby making it difficult to use. When the location where the value of the dial gauge moves from zero to 0.4 is compared with the location where that value moves from zero to 0.8, to cite an example, the actual sound interval ratio is not 1:2 i.e. a difference of one octave, despite the fact that the dial gauge shows a ratio of 1:2. As the drum head is stretched tightly, it is difficult to indicate the high or low sounds on the dial gauge.

When a snare drum is tuned to a high pitch, therefore, the value on the dial gauge will remain unchanged even if the tightening bolt is adjusted in that tuned state. As a result, it has not been easy to evenly stretch the drum head. When a bass drum is tuned to a low pitch, on the other hand, it has been difficult to make any adjustment as the value on the dial gauge has tended to be too sensitive. This is believed to be due to the fact that the value Y, which is displayed by the dial gauge in the above device, is in the relationship of $Y=1-X$, as compared with the distance which the detection bar sinks into the drum head. Both the distance of the sinking in and the amount of a protrusion of the measurement element in this invention are designated X, as they are equal.

SUMMARY OF THE INVENTION

An object of the invention is to solve the above described problems. The invention offers a sound comparing device for a drum which provides a measured value corresponding to the sound step, and is conveniently used even for drums whose sound heights are different.

The invention concerns a sound comparison device for a drum, comprising a main body of the device with a bottom that contacts the surface of the drum head, a measuring element which is biased such that its tip protrudes from the bottom of the main body, thereby pressing against and sinking into the drum head, and a display means which is linked with the measurement element and displays a numerical value Y conforming to the distance X that the measuring element protrudes from the body. The display means displays the value $Y=K/X^{+hu\ 1/2}$ where K is a constant that is suitably set.

Other features and advantages of the present invention will become apparent from the following description of the invention which refers to the accompanying drawings.

DETAILED DESCRIPTION OF THE PREFERRED EMBODIMENT

Figure 1:
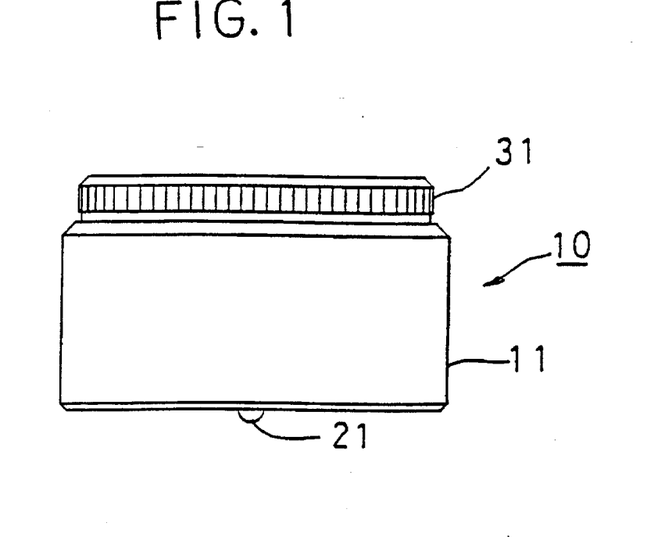
FIG. 1 is a side view of a device of the invention.

Referring to FIG. 1, sound comparison device 10 of this invention includes a main body 11, a measuring element 21 having a tip that sticks out of the bottom of the main body 11 and a display 31 for displaying a number corresponding to the amount the element 21 protrudes from the bottom of the body 11. That number is derived from the simple formula $Y=K/X^{+hu\ 1/2}$, where Y is the displayed value, X is the distance the element 21 protrudes and K is a constant. The below described device measures the distance X and the display means is built to convert that distance into the displayed value Y.

Figure 2:
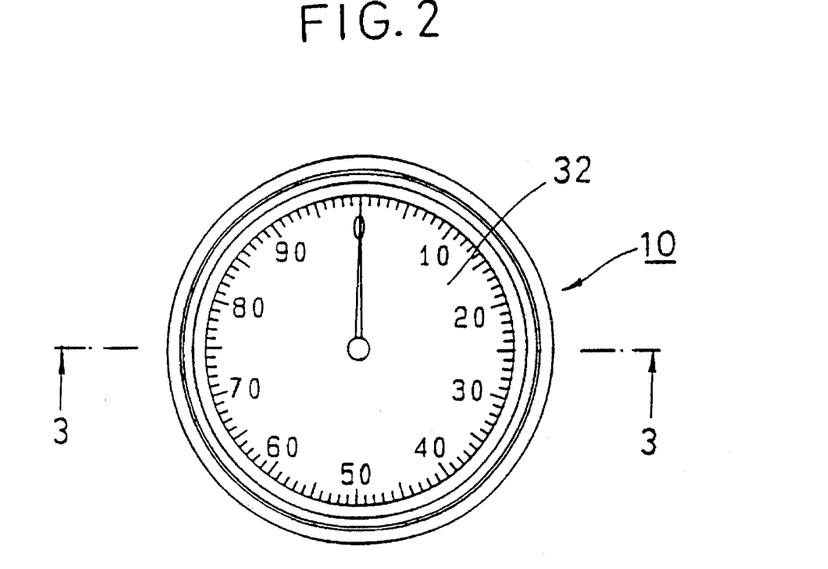
FIG. 2 is a plan view of the device.
Figure 3:
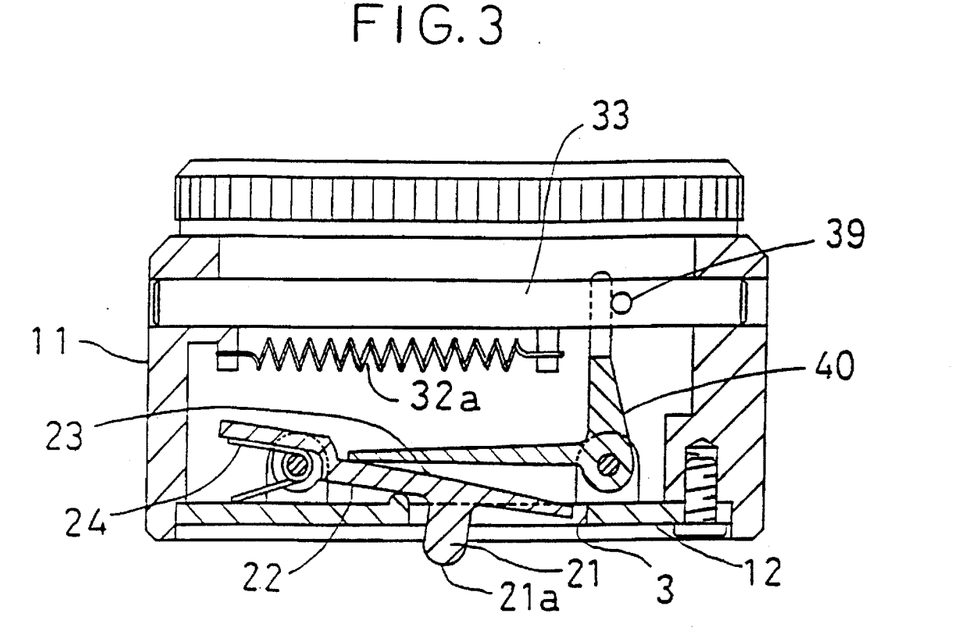
FIG. 3 is an elevational cross section cut along line 3—3 in FIG. 2.
Figure 4:
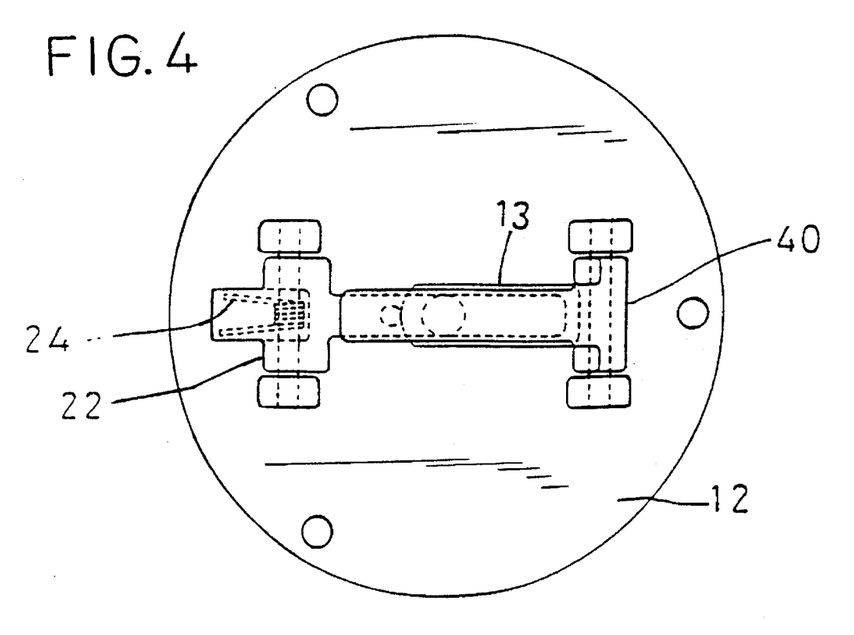
FIG. 4 is a sketch of the interior of the main body as viewed from above.

As is shown in FIGS. 1 and 3, the main body 11 includes a tubular casing. The display part 32 (FIG. 2) of the display 31 (FIG. 1) is provided at the upper part of the casing. A bottom plate 12 supports a swinging lever 40 at a pivot toward one side of the plate and also supports a measuring element lever 22 provided below the lever 40 at a pivot toward the other side of the plate. Approximately at the center of the bottom plate 12, there is an oblong hole 13 (FIG. 4) through which the tip of the measuring element 21 protrudes.

Figure 5:
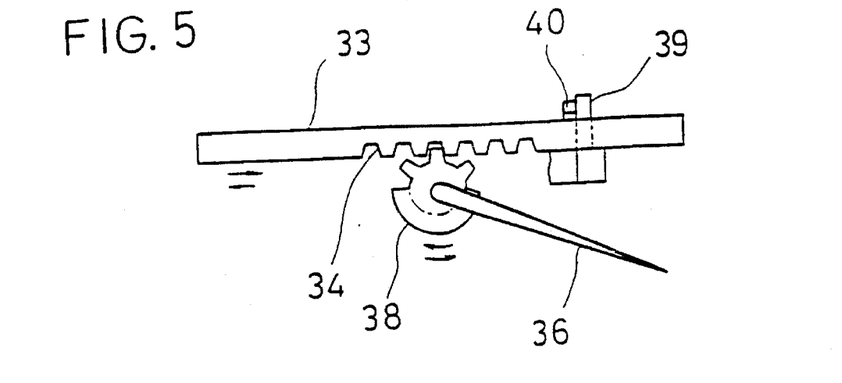
FIG. 5 illustrates the action of the indicator needle.

The display 31 has its display part 32 facing upward, thereby facilitating observation of the measured value. The display 31 is a dial gauge, including a gear toothing 34 formed along a spindle 33 (FIGS. 3 and 5) which is biased in one direction by a spring 32. A sprocket 38, which is integral with a needle 36, is engaged with the gear toothing 34, so that the sprocket may rotate around its axis along with the needle 36 upon the lengthwise sliding of the spindle 33.

An engaging pin 39 protrudes from the side of the spindle 33. The upper end of the upstanding leg of L-shaped swinging lever 40 engages the pin 39. Clockwise swinging of the lever 40 in FIG. 3 causes the spindle 33 to slide to the right. The swinging lever 40 is bent in the shape of an L as viewed from the side, and it is pivoted at the bend so as to swing freely around the inner surface of the bottom plate 12 of the main body 11. The lower leg of the lever 40 is in contact with the upper surface of the measuring element lever 22.

The measuring element lever 22 has its swing axis spaced away from that of the lever 40, and the lever 22 is pivoted to swing freely on the inner surface of the bottom plate 12 of the main body 11. The pivot of lever 22 is at the side of the body opposite to the side of the body where the pivot of lever 40 is located. Hole 13 on is located on the bottom plate of the main body between the two pivots.

The measuring element 21 comprises a protrusion formed on the lower surface of the measuring element lever 22, and the tip 21a of the measuring element protrudes through the hole 13 in the bottom plate. The measuring element lever 22 is biased by the spring 24 to normally cause the tip of the measuring element 21 to protrude through the hole 13. The measuring element 21 rises as it is pushed upward by the drum head so that the amount of protrusion is reduced, causing measuring element lever 22 swings upward. This to swing up the swinging lever 40 that contacts the upper surface of the measuring element lever 22. The spindle 33, which is engaged with the top end of the swinging lever 40 by pin 39, slides to the right in FIG. 3, causing the needle 36 to rotate.

The top contact surface 23 of the measuring element lever 22 against the lower leg of the swinging lever 40 is shaped with a prescribed convex curvature so that the contact position between the swinging lever 40 and the measuring element lever 22 gradually changes throughout the swinging of the measuring element lever 22. One example of selecting the curved shape of the contact surface 23 is explained herein in the case where the amount of the sliding of the spindle 33 serves as it is as the value Y of the display part 32. Optionally, the lower surface of the swinging lever 40 is also curved.

Figure 9:
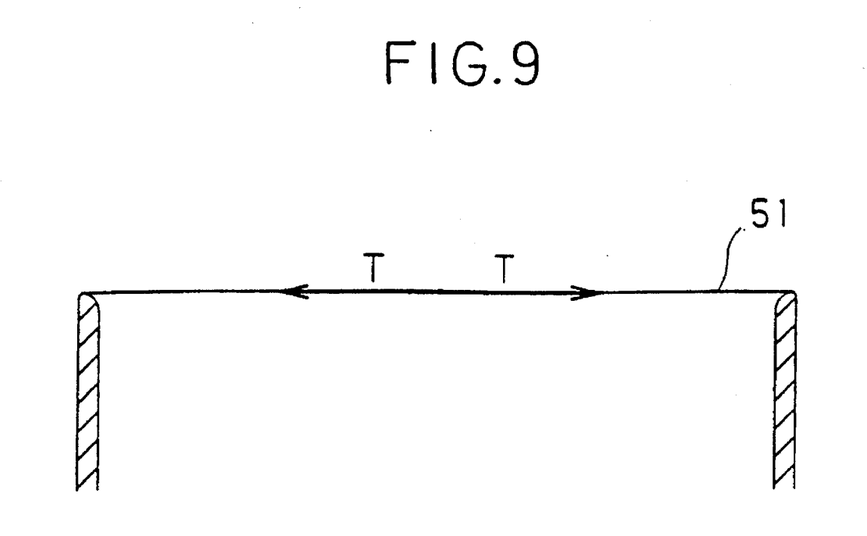
FIG. 9 shows the tensile force on the drum head.

The bottom of a sound step comparison device 10 (FIG. 10) is placed on the surface of the drum head 51 (FIG. 9) which is stretched with a tensile force T. That portion of the tensile force that has been increased by the weight W1 of the device 10 and the pressure W2 applied by of the measuring element 21 is expressed by T1. The angle between the tensile force T1 and the horizontal direction is expressed by θ1. Then the tensile force outside the device 10 becomes T/cos θ1+T1.

Figure 10:
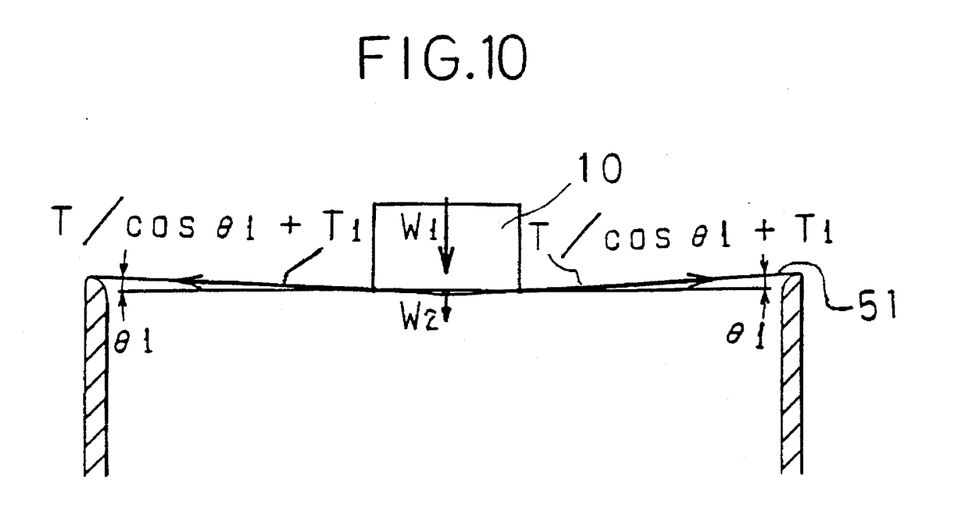
FIG. 10 shows the tensile force of the drum head at the time of a measurement.
Figure 11:
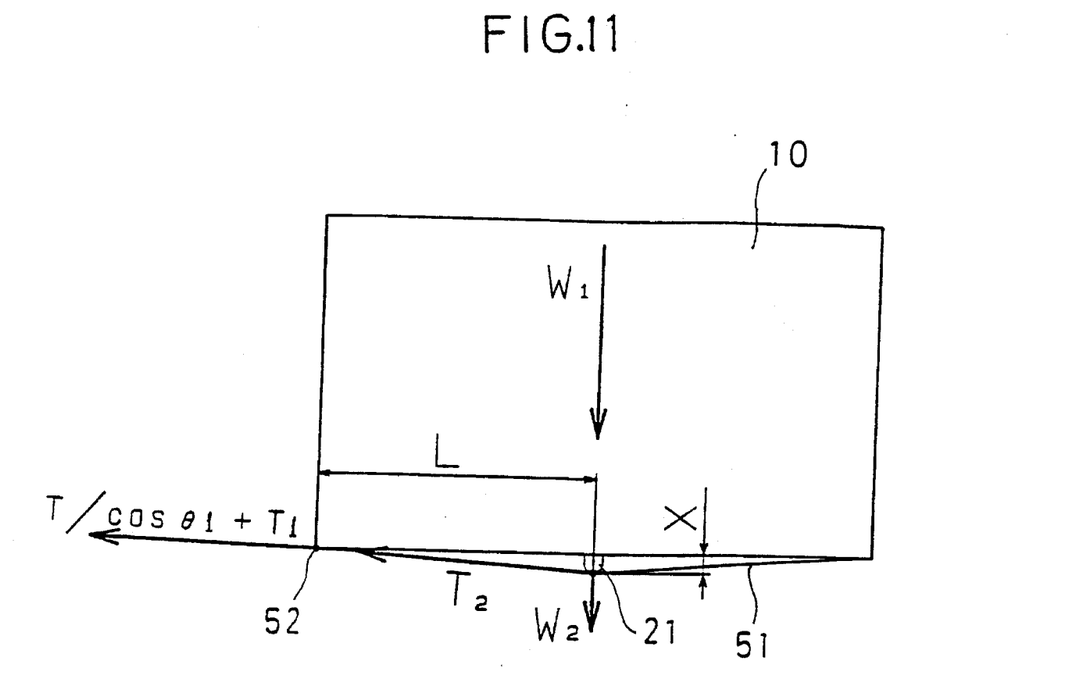
FIG. 11 is an expanded view of FIG. 10.

FIG. 11 shows an expanded view of the FIG. 10. The surface of the drum head 51 is pushed in and slightly deformed by the tip of the measurement element 21, which protrudes from the bottom of the device 10. The element 21 sinks in by a prescribed amount as compared with a ring-shaped contact 52 along the outer periphery of the device 10. The depth of the greatest depression of this drum head 51 corresponds to the distance of the protrusion X of the measuring element 21 beneath the body 11. The distance from the outer periphery of the ring shape of the device 10 to the tip 21a of measuring element 21 is expressed by L. The tensile force of the drum head inside the device 10 is expressed by T2. The following relationship applies:

$$T2 \cdot X/(L^2+X^2)^{+hu\ 1/2} = (W1+W2)/2$$

$$T2 = (W1+W2) \cdot (L^2+X^2)^{+hu\ 1/2+b}/2X$$

Since $X \ll L$, $$T2 = (W1+W2) \cdot L/2X \quad (1)$$

Figure 12:
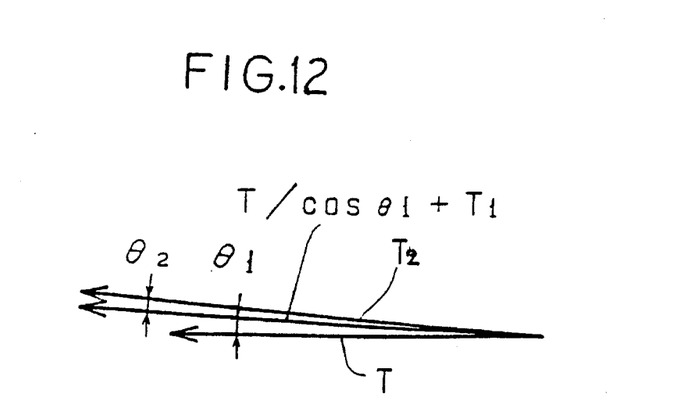
FIG. 12 shows the relationship of the tensile forces.

FIG. 12 shows the relationship between the various tensile forces and their angles. If it is assumed that there is no friction between the drum head and the device 10 at the ring shaped contact 52 between the outer periphery of the device 10 and the drum head 51, the following is obtained from FIG. 12: (T/cos θ1+θ1+T1)·cos θ1=T2 cos (θ1+θ2)

Because both $\theta_1$ and $\theta_2$ are small, the above can be converted into the following:

$$T+T1=T2 \quad (2)$$

If equation (1) is inserted into equation (2), the following can be obtained:

$$T+T1=(W1+W2) \cdot L/2X \quad (3)$$

It can be seen from equation (3) that the sum of the original tensile force T and the tensile force T1, increased by the weight W1 of the device and the pressure W2 of the measuring element or (T+T1), becomes inversely proportional to the amount of the protrusion X of the measuring element.

Since the ratio of T1 as compared with T is small, further, the following becomes valid:

$$T=(W1+W2) \cdot L/2X$$

The drum head is a circular membrane. Assuming that the tensile forces at all points on the surface over the drum head are equal in all directions and that the forces remain constant even during the drum head vibrations, and by expressing the radius of the drum head by a, the surface density (mass per unit area) by $\rho$ and the tensile force by T, the number of the basic vibrations (nu) will be as follows:

$$\begin{aligned}(nu) &= (2.404/2(pi)a) \cdot (T/\rho)^{1/2} \quad (5)\\ &= (0.765/2a) \cdot (T/\rho)^{1/2}\end{aligned}$$

Thus, it becomes proportional to the square root of the tensile force T of the drum head.

The number of the basic vibrations (nu) will be as follows, on the basis of equations (4) and (5):

$$\begin{aligned}(nu) &= (2.404/2(pi)a) \cdot (T/\rho)^{1/2} \quad (6)\\ &= (0.765/2a) \cdot ((W1+W2)L/2\rho X)^{1/2}\end{aligned}$$

Thus, the number of basic vibrations is seen to be inversely proportional to the square root of the amount of the protrusion X of the measuring element. It is mentioned here that the basic vibration number (nu) corresponds to the highness or lowness of the sound pitch.

The invention indicates the value $Y=K/X^{1/2}$ (where K is a constant) by its display. Therefore, the value Y corresponds to the highness or lowness of the sound pitch, and the basic vibration number of the drum head at the measuring site can be read from the distance of the protrusion X of the measuring element.

Figure 13:
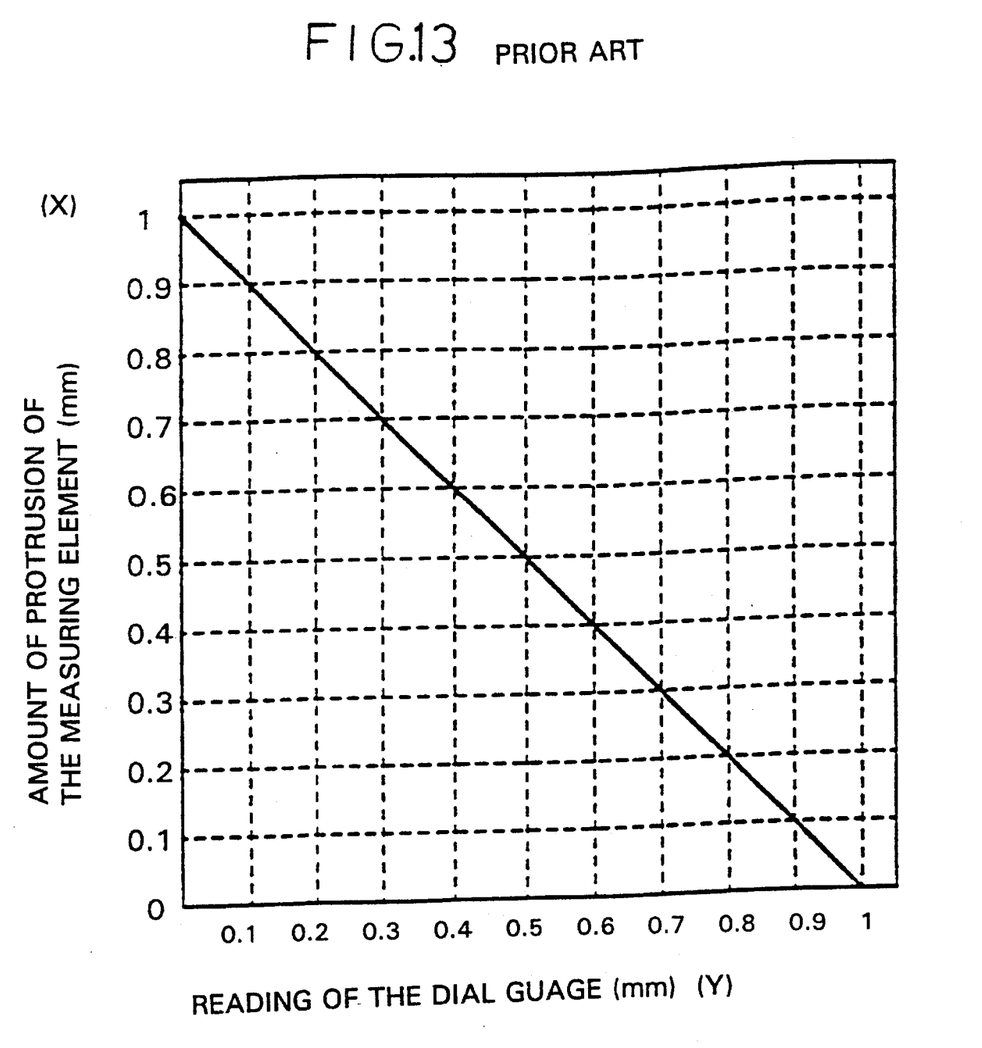
FIG. 13 reflects Y=1−X, charting measurements with a prior art device.
Figure 14:
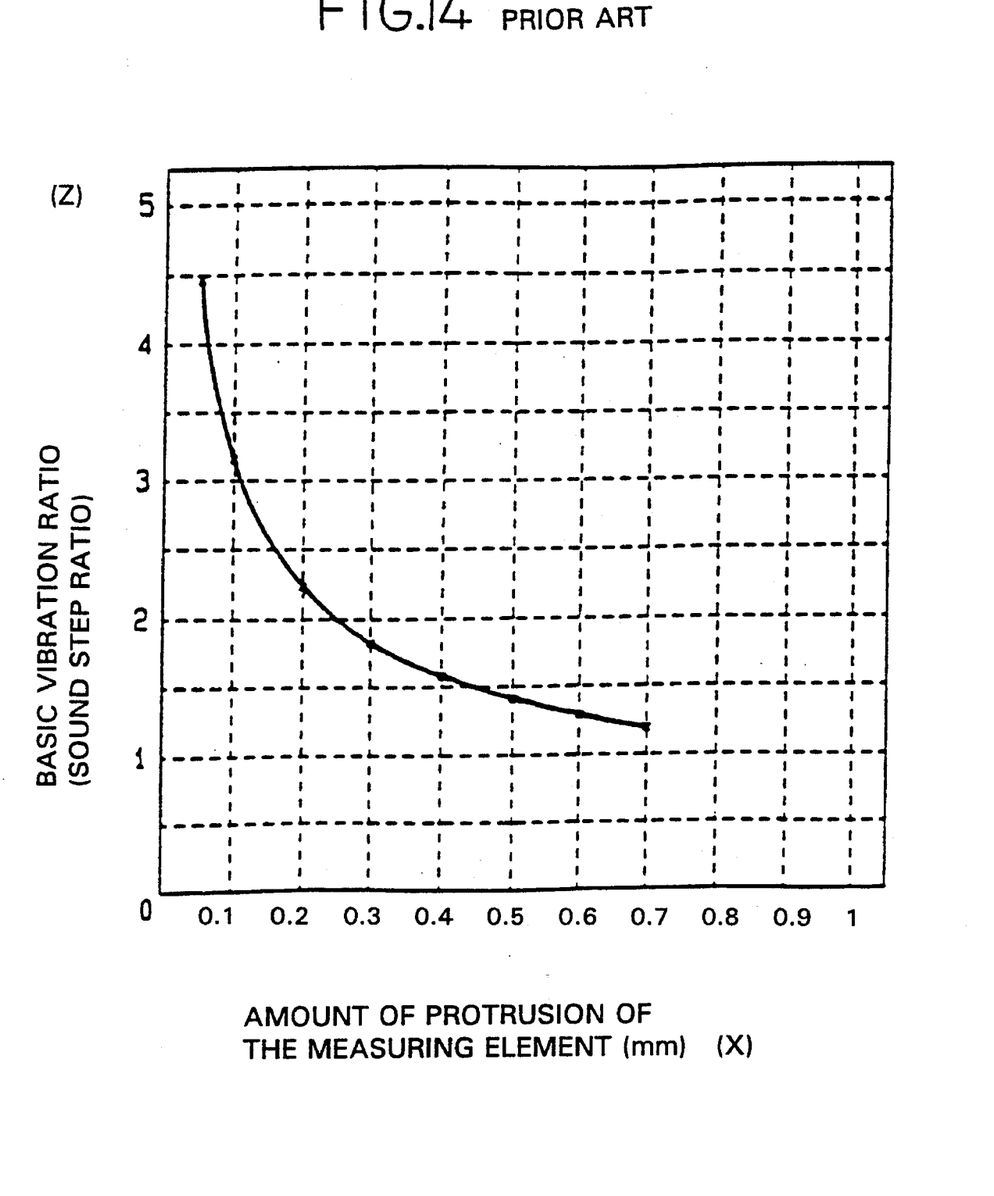
FIG. 14 reflects $Y=1/X^{+hu\ 1/2}$, charting measurements with the prior art.
Figure 15:
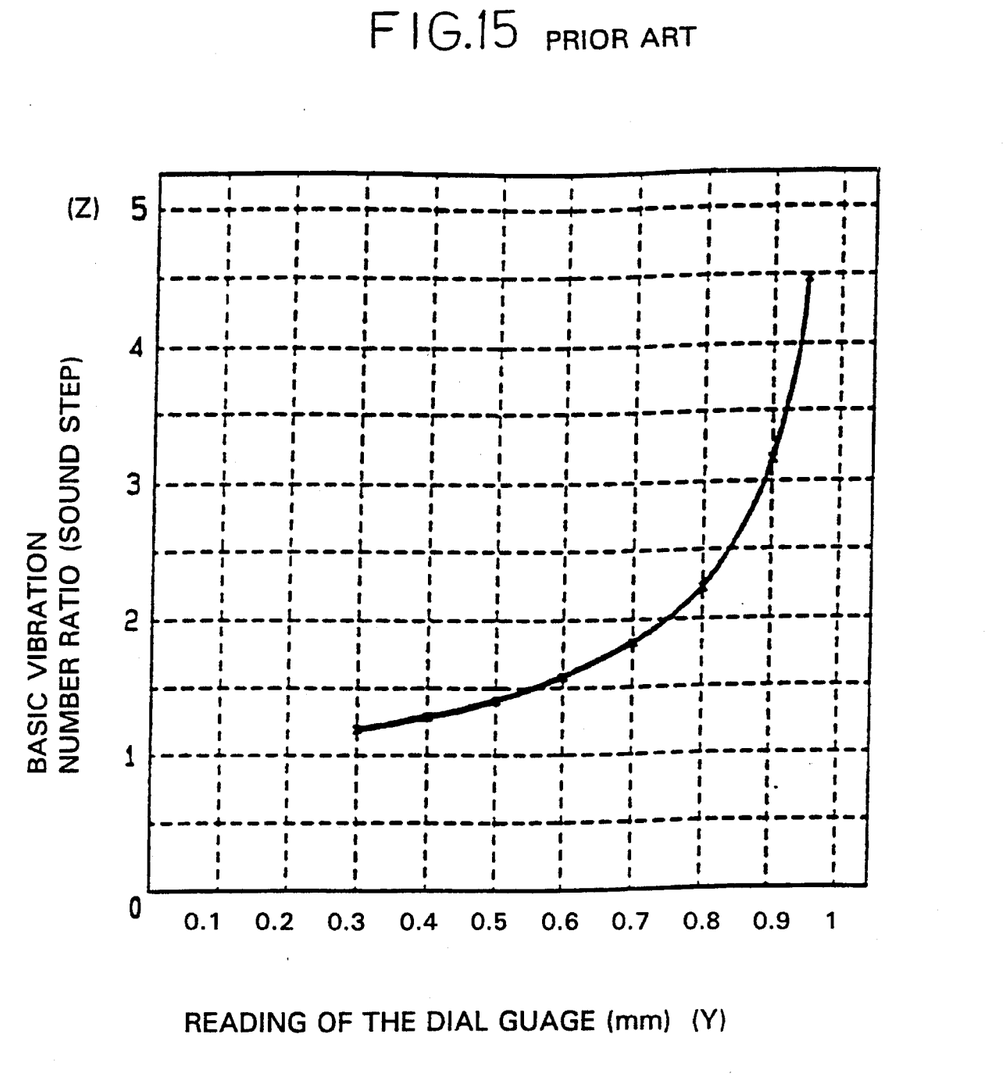
FIG. 15 shows $Z=1/(1-y)^{+hu\ 1/2}$ again with the prior art.

The above results will now be compared to the prior art device, the function of which is shown in graphs in FIGS. 13 through 15.

FIG. 13 shows Y=1−X, reflecting the relationship between the reading Y by the measuring device according to prior art and the distance of the protrusion X (distance of sinking in) of the measuring element (detection bar).

Since the following can be obtained from equation (6), $(nu) \cdot (2a/0.765) \cdot (2\rho)/(W1+W2)L)^{1/2+b} = 1/X^{1/2}$ If, on the assumption that $Z=(nu) \cdot (2a/0.765) \cdot (2\rho/(W1+W2)L)^{1/2}$, Z is considered to be the basic vibration number ratio, it will be as follows:

$$Z=1/X^{1/2} \quad (7)$$

The equation (7) is indicated in FIG. 14.

FIG. 15 shows $Z=1/(1-Y)^{1/2}$, which reflects the relationship between the reading Y of the tensile force measuring device according to the prior art and the basic vibration number Z. FIG. 15 shows that there is a substantial difference in the change ratio of the basic vibration number between the reading of the conventional device in the 0.3 through 0.6 neighborhood and the reading of the conventional device in the 0.8 and 0.9 neighborhood.

With the prior art device, in tuning by raising the pitch of the snare drum, etc., the reading Y scarcely changes even if the tightening bolt may be tightened or loosened from that position or, in tuning by lowering the pitch of a bass drum, etc., the excessive sensitivity greatly changes the reading Y.

Figure 16:
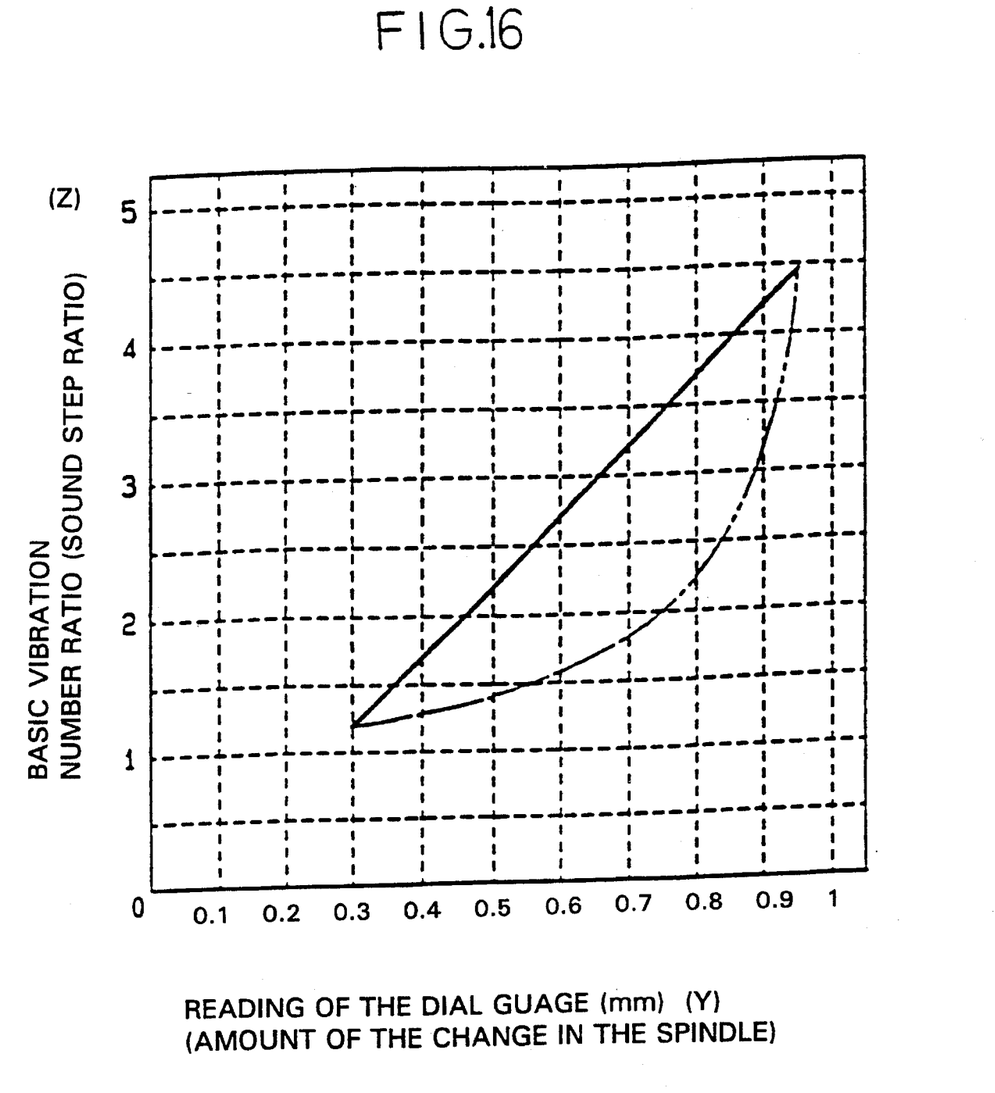
FIG. 16 shows that the basic vibration number ratio Z and the amount of the sliding of the spindle are in a linear relationship in the invention.

FIG. 16 illustrates that with the present invention, the basic vibration number ratio Z and the sliding distance of the spindle 33 are in a linear relationship. FIG. 16 is prepared from FIG. 15. The chain line in FIG. 16, indicates what is shown in FIG. 15. In FIGS. 15 et seq., only that range which is required for an adjustment of the actual drum head is shown.

Figure 17:
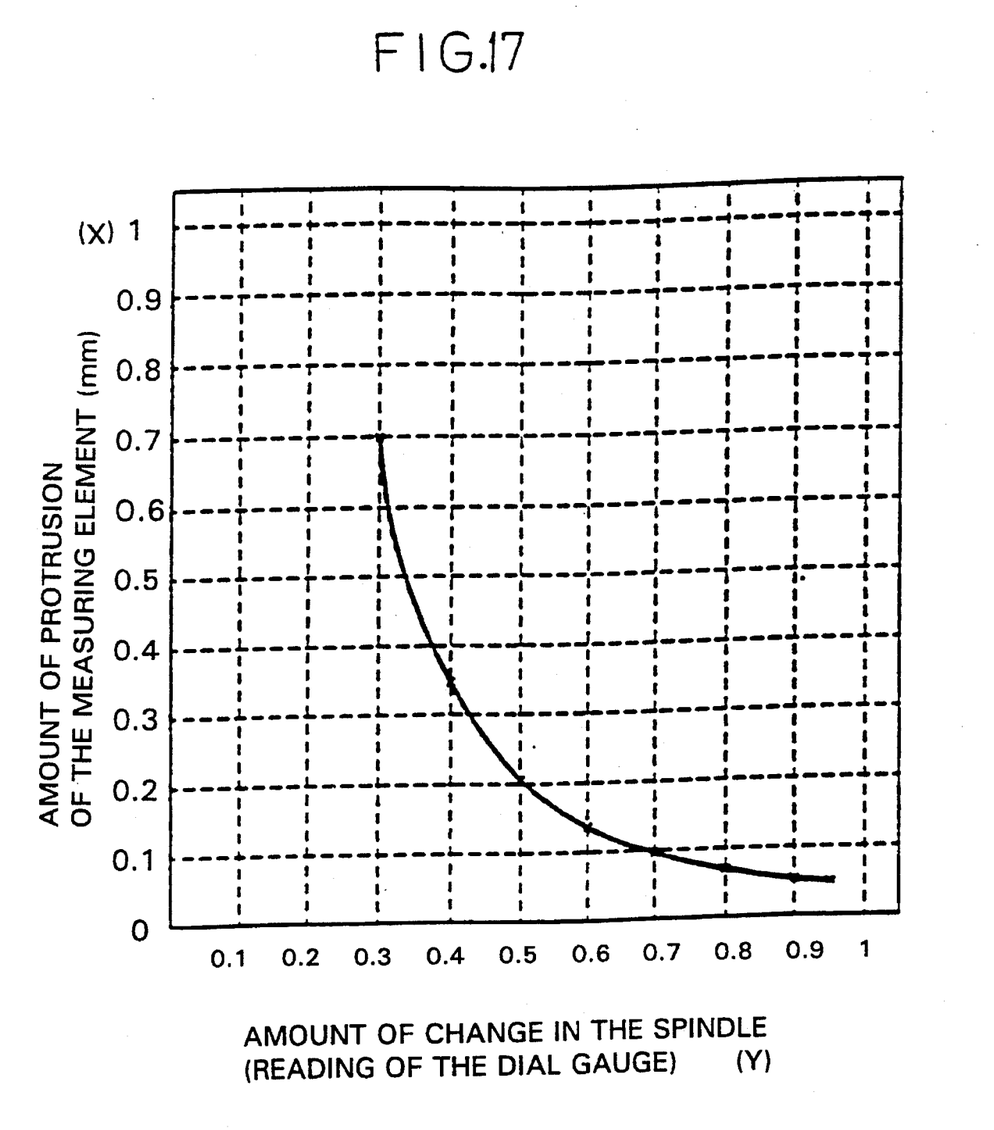
FIG. 17 is plot of the amount of the sliding of the spindle corresponding to the amount of the protrusion X of the measuring element on the basis of FIGS. 14 and 16 and illustrates the invention.

The sliding distance of the spindle 33 corresponds to the distance X of the protrusion of the measuring element and is obtained from the FIGS. 14 and 16 and this is used to prepare FIG. 17. The distance that the spindle 33 slides for the distance of the protrusion X of the measuring element 21 is obtained for the necessary range by using FIG. 17.

Figure 6A:
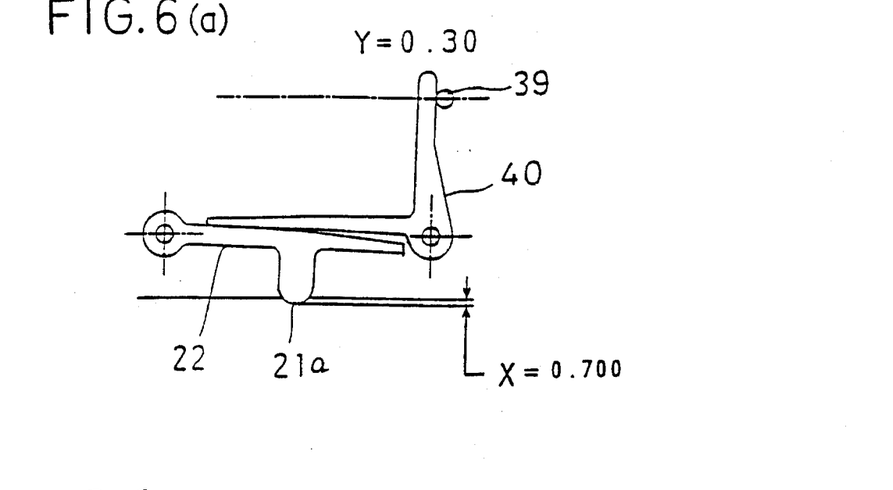
FIGS. 6a, b and c show the action of the measuring element.
Figure 6B:
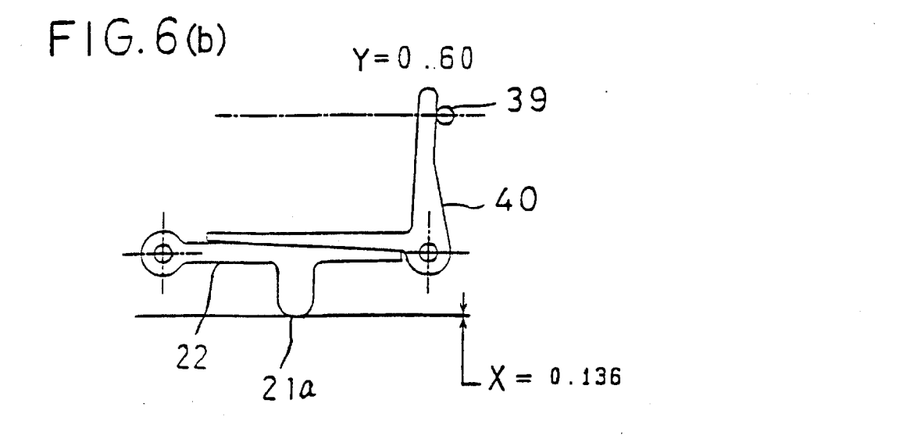
Figure 6C:
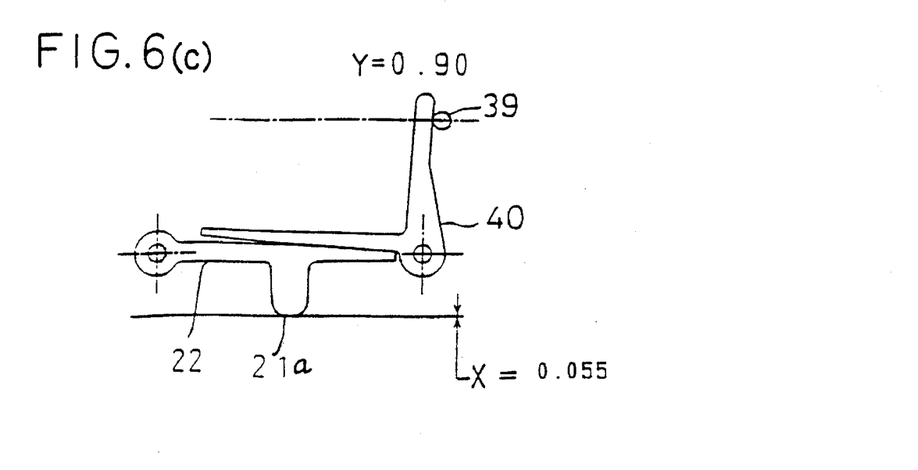

The sliding distance of the spindle 33 actually obtained from FIG. 17 is 0.3 when the amount of the protrusion is 0.7, is 0.6 when the amount of the protrusion is 0.136 and is 0.9 when the amount of the protrusion is 0.055, the protrusion settings that can be seen in FIGS. 6a, b and c. The shape of the contact surface 23 is decided by figure-drawing, etc. so as to obtain that sliding amount.

Figure 7:
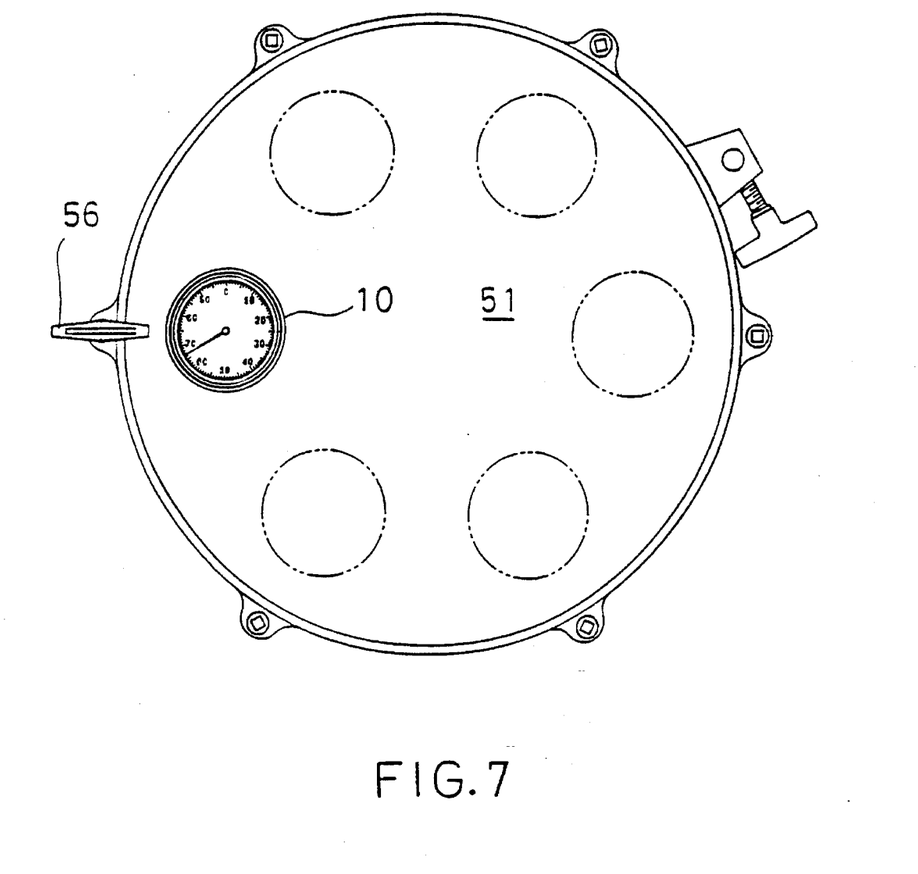
FIG. 7 is a plan view of a drum head showing the device during use.
Figure 8:
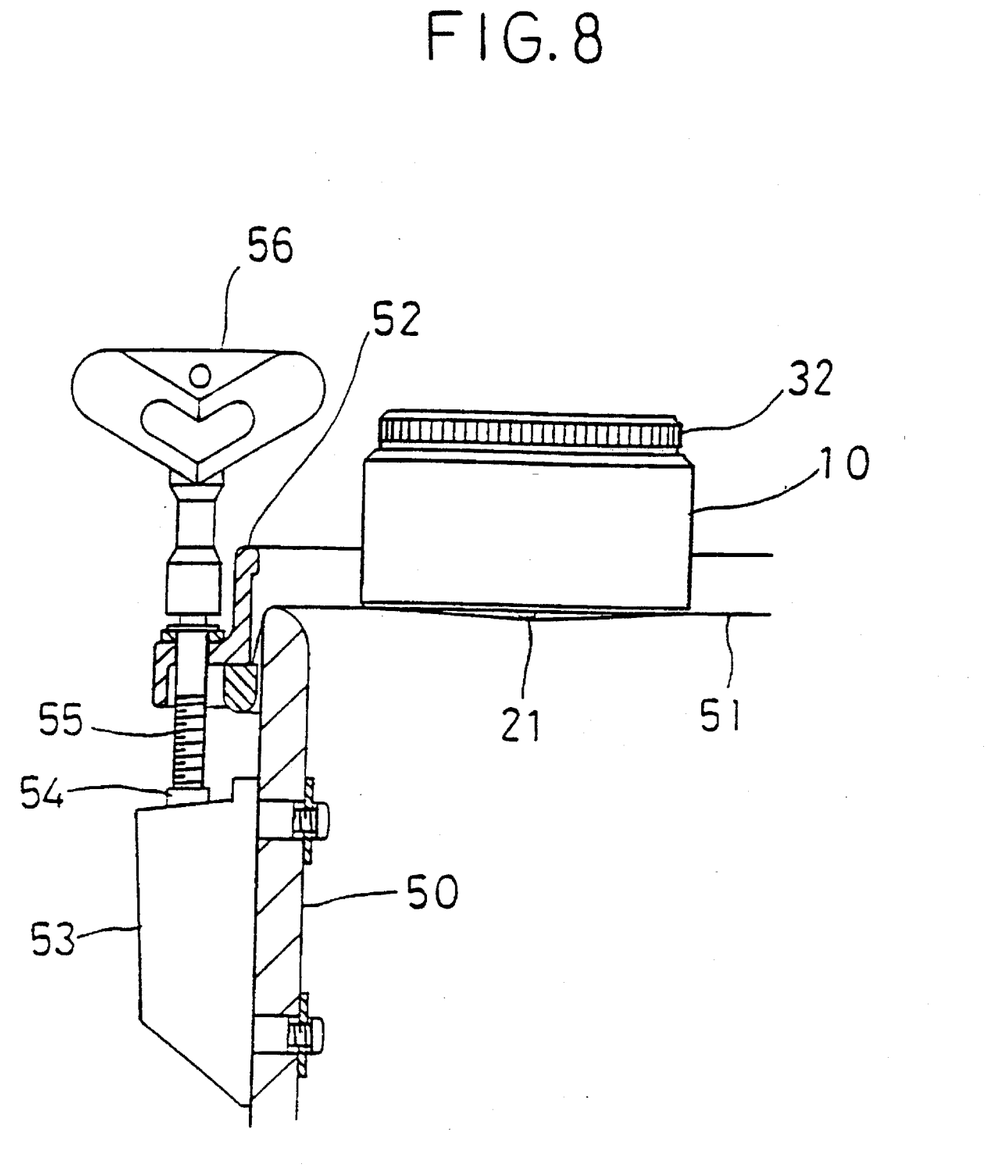
FIG. 8 is a partial cross section of part of a drum showing the device in use.

The device 10 herein is placed on the surface of the drum head 51, as shown in FIG. 7 during adjustment of the drum head. The distance that the measuring element 21 protrudes out of the bottom of the device, as shown in FIG. 8, becomes X due to the tensile force of the drum head 51. A value Y corresponding to the amount of the protrusion, or $Y=K/X^{1/2}$, is shown in the display part at the top of the device. In view of the fact that the display 32 faces upward, the displayed value can be observed easily. The device 10 is shifted gradually as shown by the two-dot line. The tensioning of the drum head is coordinated by using a tuning key 56 until the readings Y at various locations become even. This stretches the drum head evenly. The aforementioned K is suitably set considering the scale distance of the display part, K−1 for example, etc.

The device 10 has a weight in the range between 350 and 400 grams, an outer diameter, i.e. the diameter of that part which comes into contact with the drum head, is approximately 60 millimeters, the pressure applied by the measuring element 21 is in the range between 130 and 150 grams. Further, the device 10 is capable of measuring drum head tension of both bass drums and snare drums.

Although a dial gauge of the needle type is shown as the display, one may use a digital display or the display may accommodate light so as to facilitate its being read at a dark spot. In addition, a calculator may be incorporated so as to read the value X of the measuring element, with an output display being made for the $K/X^{1/2}$.

The device of the invention enables one to accurately measure the pitch of the sound across the drum head and adjust the pitch of the drum head extremely easily as there is no reduction of the readings in the high pitch state or no increase in the change of the readings in the low pitch state as compared with the tensile force measuring device according to the prior art.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A sound comparison device for a drum, comprising:

a display;

a body supporting the display and having a bottom with a periphery, the periphery of the bottom of the body being adapted to contact a surface of a drum head of the drum, the drum head having a basic vibration number ratio; and a drum head tension measurement element mounted on the body, the measurement element including a measurement lever is pivotally mounted and has a tip thereon which protrudes a distance X from the bottom of the body, the distance X varying as the measurement lever pivots;

a swinging lever swingably supported on the body and having first and second mutually-connected arms the first and second arms being connected approximately perpendicular to one another, the first arm of the swinging lever being connected to the display, and the second arm contacting the measurement lever, such that, as the measurement lever pivots., the display displays a numerical value Y which corresponds to the distance X in accordance with $Y=K/X^{+hu\ 1/2}$, where K is a constant and Y is linearly related to the basic vibration number ratio of the drum head; and means biasing the tip so as to press the tip against the drum head and sink the tip into the drum head to the distance X determined by the tension on the drum head and normally urging the measurement lever to pivot to cause the tip to protrude from the body.

2. The sound comparison device of claim 1, wherein the periphery of the body in contact with the drum head surface extends around the tip of the measurement element and the tip of the measurement element protrudes within the space surrounded by the periphery of the body.

3. The device of claim 2, where the value Y is selected to correspond to the highness or lowness of the sound pitch of the drum head.

4. The device of claim 1, wherein at least one of the measurement lever and the second arm of the swinging lever, respectively, is curved.

5. The device of claim 1, wherein the display is mounted on the body so as to be parallel to the surface of the drum head.

6. The device of claim 1, wherein the first and second arms are connected approximately perpendicularly to one another to form an L-shape.

* * * * *